US012360483B2

(12) United States Patent
Kikuchi et al.

(10) Patent No.: US 12,360,483 B2
(45) Date of Patent: Jul. 15, 2025

(54) HEATER, FIXING DEVICE, AND IMAGE FORMING APPARATUS

(71) Applicant: Toshiba Tec Kabushiki Kaisha, Tokyo (JP)

(72) Inventors: Kazuhiko Kikuchi, Yokohama Kanagawa (JP); Osamu Takagi, Tokyo (JP); Chie Miyauchi, Odawara Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/543,935

(22) Filed: Dec. 18, 2023

(65) Prior Publication Data

US 2024/0152081 A1 May 9, 2024

Related U.S. Application Data

(63) Continuation of application No. 18/087,831, filed on Dec. 23, 2022, now Pat. No. 11,880,152, which is a continuation of application No. 17/391,032, filed on Aug. 2, 2021, now Pat. No. 11,573,514, which is a continuation of application No. 16/868,269, filed on May 6, 2020, now Pat. No. 11,106,167, which is a continuation of application No. 15/624,580, filed on Jun. 15, 2017, now abandoned.

(51) Int. Cl.
*G03G 15/20* (2006.01)

(52) U.S. Cl.
CPC ..... *G03G 15/2057* (2013.01); *G03G 15/2053* (2013.01); *G03G 15/206* (2013.01)

(58) Field of Classification Search
CPC .......... G03G 15/2028; G03G 15/2053; G03G 15/2057; G03G 15/206; G03G 15/6576
See application file for complete search history.

(56) References Cited

U.S. PATENT DOCUMENTS 5,302,808 A 4/1994 Sato et al.
6,384,378 B2 5/2002 Natsuhara et al.
6,392,197 B2 5/2002 Natsuhara et al.
(Continued)

FOREIGN PATENT DOCUMENTS

CN 103376720 A 10/2013
JP H07-271217 A 10/1995
(Continued)

OTHER PUBLICATIONS

Chinese Office Action dated Oct. 28, 2019, mailed in counterpart Chinese Application No. 201710454695.4, 17 pages (with Translation).

(Continued)

*Primary Examiner* — Hoang X Ngo
(74) *Attorney, Agent, or Firm* — Kim & Stewart LLP

(57) ABSTRACT

A heater is to face a pressure element via a belt and is to heat the belt. The pressure element sandwiches and conveys a sheet together with the belt. The heater includes a substrate, a heat generating element, a couple of electrodes, and a protective layer. There are the electrodes on both sides of the heat generating element in a conveyance direction of the sheet. Both sides of the heat generating element in the conveyance direction are connected to adjacent electrodes.

20 Claims, 6 Drawing Sheets

(56) References Cited

U.S. PATENT DOCUMENTS

| | | | | |
|---|---|---|---|---|
| 9,037,024 | B2 | 5/2015 | Kasama | |
| 9,411,276 | B2 | 8/2016 | Takagi | |
| 2012/0121304 | A1 | 5/2012 | Tokuda et al. | |
| 2013/0195522 | A1 | 8/2013 | Kasama | |
| 2013/0279957 | A1 | 10/2013 | Kasama | |
| 2015/0086251 | A1 | 3/2015 | Takayanagi | |
| 2016/0026131 | A1 | 1/2016 | Sato et al. | |
| 2016/0070225 | A1 | 3/2016 | Akiyama et al. | |
| 2020/0285179 | A1* | 9/2020 | Seki | G03G 15/2053 |
| 2023/0400800 | A1* | 12/2023 | Takeuchi | G03G 15/2053 |

FOREIGN PATENT DOCUMENTS

| | | | |
|---|---|---|---|
| JP | H08-55674 | A | 2/1996 |
| JP | H08-63015 | A | 3/1996 |
| JP | 2004-102038 | A | 4/2004 |

OTHER PUBLICATIONS

Extended European Search Report dated Nov. 27, 2017, filed in counterpart European Patent Application No. 17176385.7, 12 pages.

Notice of Reasons for Refusal mailed Mar. 2, 2021 in corresponding Japanese Patent Application No. 2017-097323, 18 pages (with Translation).

English translation of Notice of Reasons for Refusal mailed Apr. 19, 2022 in corresponding Japanese Patent Application No. 2021-109893, 5 pages.

* cited by examiner (A)

(B) (Related Art)

HEATER, FIXING DEVICE, AND IMAGE FORMING APPARATUS

CROSS-REFERENCE TO RELATED APPLICATIONS

This application is a continuation of U.S. patent application Ser. No. 18/087,831, filed on Dec. 23, 2022, which is a continuation of U.S. patent application Ser. No. 17/391,032, filed on Aug. 2, 2021, now U.S. Pat. No. 11,573,514, issued on Feb. 7, 2023, which is a continuation of U.S. patent application Ser. No. 16/868,269, filed on May 6, 2020, now U.S. Pat. No. 11,106,167, issued on Aug. 31, 2021, which is a continuation of U.S. patent application Ser. No. 15/624,580, filed on Jun. 15, 2017, now abandoned, which is based upon and claims the benefit of priority from Japanese Patent Application No. 2016-121404, filed on Jun. 20, 2016 and Japanese Patent Application No. 2017-097323, filed on May 16, 2017; the entire contents of each of which are incorporated herein by reference.

FIELD

Embodiments described herein relate generally to a technique for fixing a toner image formed on a sheet onto the sheet.

BACKGROUND

A fixing device that conveys a sheet with an endless belt and a pressure roller and heats the sheet with a plate-shaped heater disposed on the inner surface of the endless belt has been known in the art. The heater and the pressure roller together form an interposing and pressurizing region of the sheet (endless belt). A length of the interposing and pressurizing region in a sheet conveyance direction is referred to as a nip width. The fixing device fixes the toner image on the sheet onto the sheet by heating, while interposing under pressure, the sheet conveyed through the nip width.

When the nip width is increased, the heater can be sufficiently pressed against the sheet via the endless belt. Thus, the sheet can be heated excellently. In order to increase the nip width, it is conceivable to increase a load on the heating member by the pressure roller or to increase the diameter of the pressure roller. When a load on the heating member by the pressure roller is increased, however, there is a risk of increasing the occurrence of a crack in the heating member and the degree of deterioration in the endless belt. When the diameter of the pressure roller is increased, the heat capacity of the pressure roller is increased and thus heat from the heating member is deprived by the pressure roller. Therefore, the amount of heat generation in the heating member needs to be increased when the diameter of the pressure roller is increased.

DETAILED DESCRIPTION

A heater according to an embodiment includes a heat generating element and a protective layer. The protective layer covers the heat generating element, and at least part of a surface thereof has a convex surface that is convex toward the heat generating element.

A fixing device according to an embodiment includes an endless belt, a heater, and a pressure element. The pressure element is placed at a position to face the heater via the endless belt and configured to form, together with the endless belt, a nip to interpose a sheet being conveyed. The heater includes: a heat generating element; and a protective layer configured to cover the heat generating element and to be in contact with the endless belt. A surface of the protective layer that faces the pressure element has a concave surface that is concave with respect to the pressure element.

An image forming apparatus according to an embodiment includes an image forming unit and a fixing device. The image forming unit forms a toner image on a sheet. The fixing device heats the sheet and thereby fixes the toner image onto the sheet. The fixing device includes an endless belt, a heater, and a pressure element. The pressure element is placed at a position to face the heater via the endless belt and configured to form, together with the endless belt, a nip to interpose a sheet being conveyed. The heater includes: a heat generating element; and a protective layer configured to cover the heat generating element and to be in contact with the endless belt. A surface of the protective layer that faces the pressure element has a concave surface that is concave with respect to the pressure element.

The image forming apparatus and the fixing device according to the embodiment will now be described below with reference to the drawings.

Figure 1:
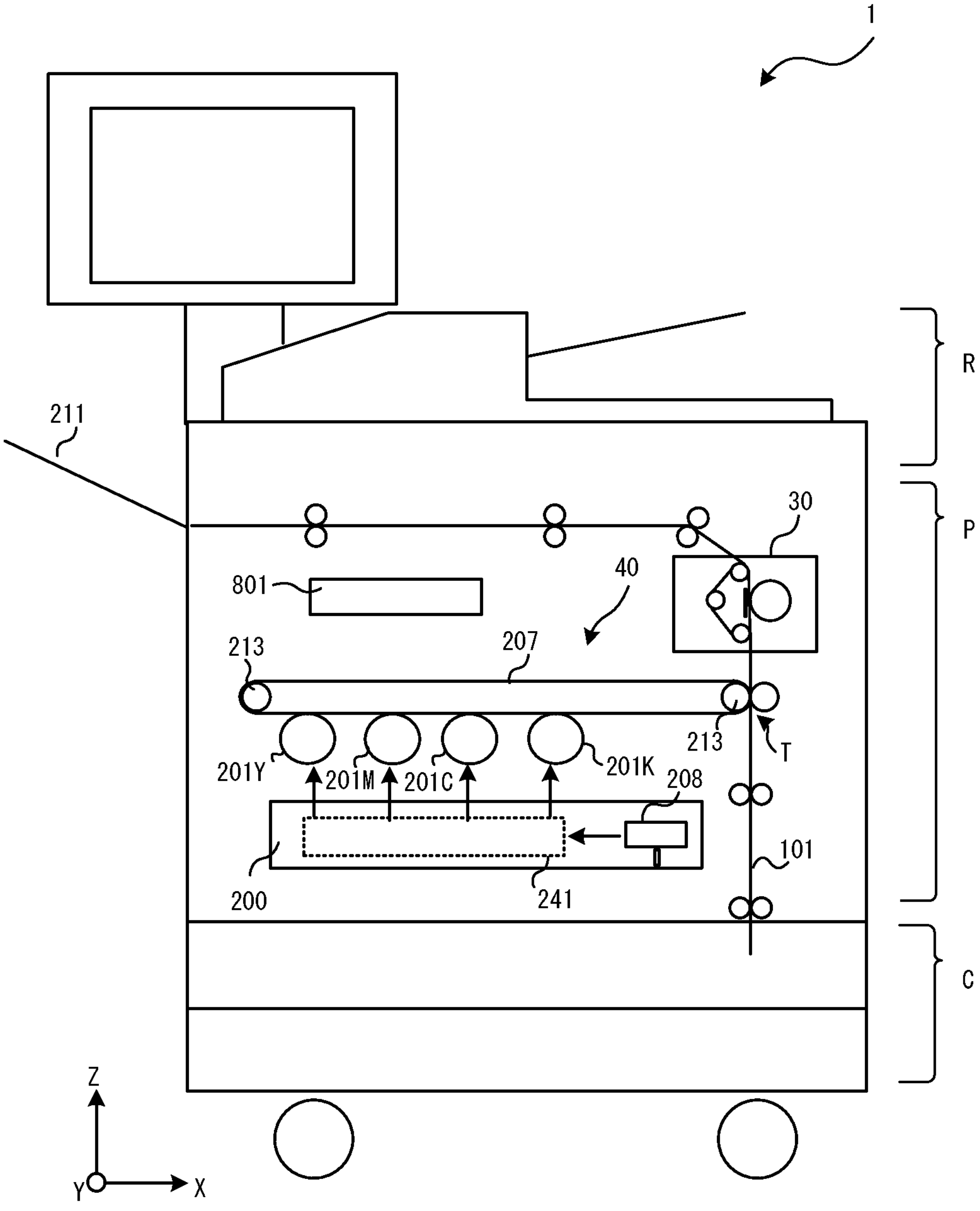
FIG. 1 is a schematic view of an image forming apparatus according to an embodiment.

FIG. 1 is a schematic view of the image forming apparatus according to the embodiment. The image forming apparatus 1 includes a reading unit R, an image forming unit P, a paper cassette unit C, and a fixing device 30. The reading unit R reads a document sheet placed on a platen with a CCD (charge-coupled device) image sensor, for example, so as to convert an optical signal into digital data. The image forming unit P acquires a document image read in the reading unit R or print data from an external personal computer, and forms and fixes a toner image on a sheet.

The image forming unit P includes a laser scanning section 200 and photoconductor drums 201Y, 201M, 201C, and 201K. The laser scanning section 200 includes a polygon mirror 208 and an optical system 241. On the basis of image signals for colors of yellow (Y), magenta (M), cyan (C), and black (K), the laser scanning section 200 irradiates the photoconductor drums 201Y to 201K to provide an image to be formed on the sheet.

The photoconductor drums 201Y to 201K retain respective color toners supplied from a developing device (not shown) according to the above irradiated locations. The photoconductor drums 201Y to 201K sequentially transfer the retained toner images onto a transfer belt 207. The transfer belt 207 is an endless belt. The transfer belt 207 conveys the toner image to a transfer location T by the rotary driving of rollers 213.

A conveyance path 101 conveys a sheet stocked in the paper cassette unit C through the transfer location T, the fixing device 30, and an output tray 211 in this order. The sheet stocked in the paper cassette unit C is conveyed to the transfer location T while being guided by the conveyance path 101. The transfer belt 207 then transfers the toner image onto the sheet at the transfer location T.

The sheet having the toner image formed on a surface thereof is conveyed to the fixing device 30 while being guided by the conveyance path 101. The fixing device 30 causes the toner image to penetrate into the sheet and fix therein by the heating and fusion of the toner image. This can prevent the toner image on the sheet from being disturbed by an external force. The conveyance path 101 conveys the sheet having the fixed toner image to the output tray 211 and ejects the sheet from the image forming apparatus 1.

A controller 801 is a unit for controlling devices and mechanisms in the image forming apparatus 1 in a centralized manner. The controller 801 includes, for example, a central processor such as a central processing unit (CPU), and volatile and non-volatile memories. According to an embodiment, a central processor controls the devices and the mechanisms in the image forming apparatus 1 by executing programs stored in memories. Alternatively, the controller 801 may implement part of the functions as a circuit.

A configuration including the sections used for conveying an image (toner image) to be formed to the transfer location T and transferring the image onto the sheet is referred to as a transfer unit 40.

Figure 2:
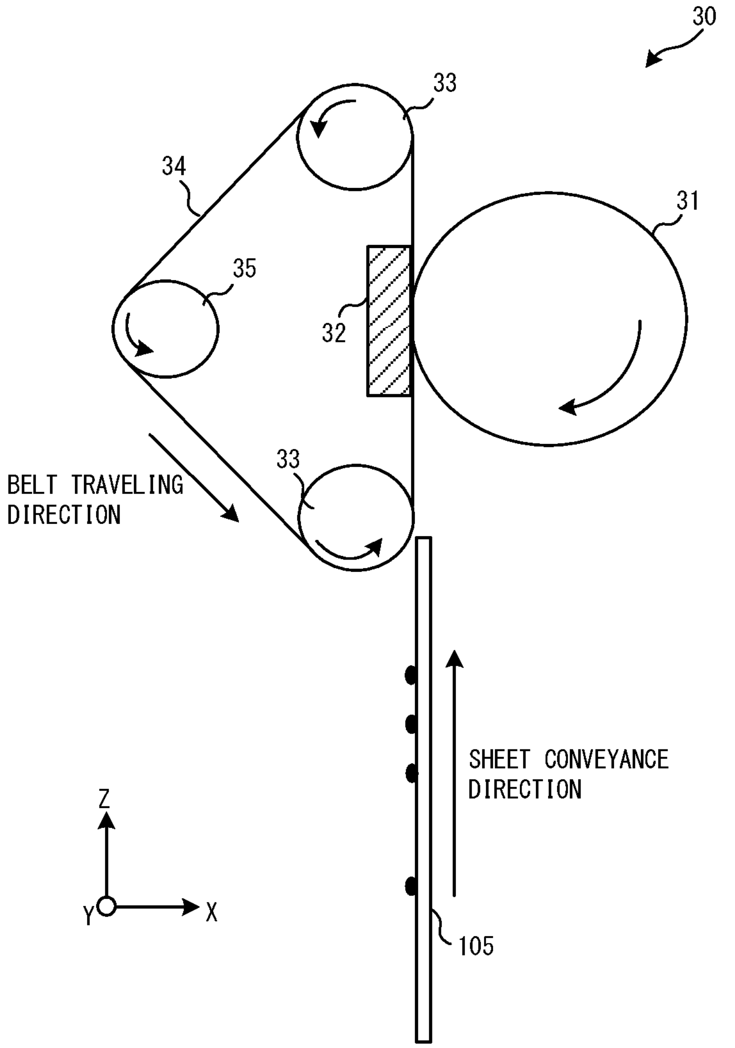
FIG. 2 is a diagram illustrating a configuration of a fixing device according to the embodiment.

FIG. 2 is a diagram illustrating a configuration example of the fixing device 30. The fixing device 30 includes a plate-shaped heater 32, and an endless belt 34 suspended by a plurality of rollers. The fixing device 30 also includes driving rollers 33 for suspending the endless belt 34 and rotary-driving the endless belt 34 in a given direction. The fixing device 30 also includes a tension roller 35 for providing tension as well as suspending the endless belt 34. The fixing device 30 also includes a pressure roller 31 having an elastic layer formed on a surface thereof. A heat-generating side of the heater 32 is in contact with an inner surface of the endless belt 34. The heater 32 is pressed against the pressure roller 31. This enables a sheet 105 having a toner image thereon to be interposed, heated, and pressurized at a contact portion (nip portion) formed by the endless belt 34 and the pressure roller 31.

The pressure roller 31 (pressure element) is placed at a position to face the heater 32 via the endless belt 34. The pressure roller 31 and the endless belt 34 together form a nip to interpose a sheet being conveyed. In other words, the nip refers to an interposing and pressurizing region of a sheet (endless belt 34) that is formed by the heater 32 and the pressure roller 31. A length of the nip in a sheet conveyance direction is referred to as a nip width.

The endless belt 34 includes a base layer (Ni/SUS/PI: a thickness of 60 to 100 μm), an elastic layer (Si rubber: a thickness of 100 to 300 μm), and a release layer (PFA: a thickness of 15 to 50 μm) sequentially provided from the side in contact with the heater 32. The thicknesses and materials of such layers are provided by way of example only.

The endless belt 34 may utilize the rotation of the pressure roller 31 as its source of motive power.

Figure 3:
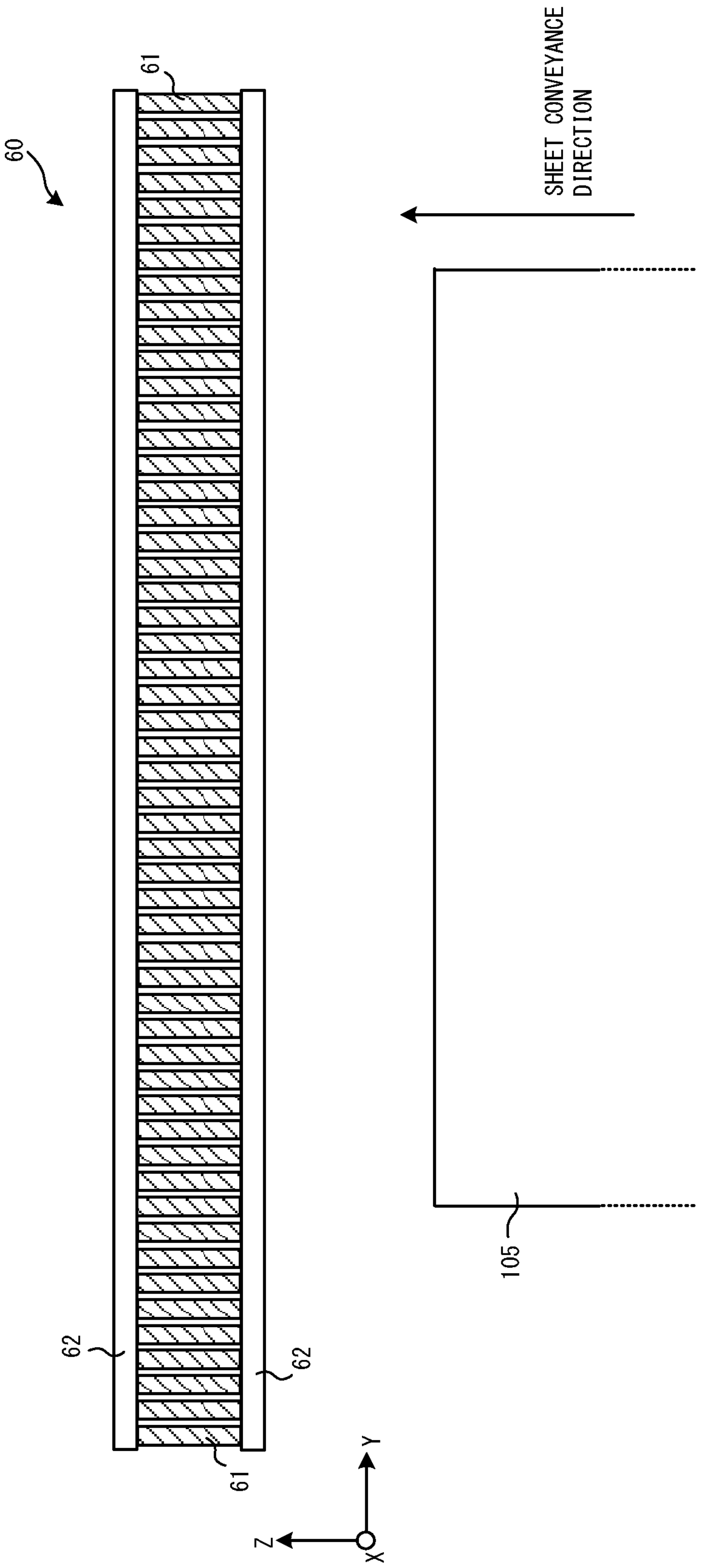
FIG. 3 is a diagram illustrating a configuration example of a heat generating resistive member according to the embodiment.

FIG. 3 illustrates a heat generating resistive member included in the heater 32. The heat generating resistive member 60 (heat generating element) is a plate-shaped member disposed to face a surface of the sheet 105 being conveyed. The heat generating resistive member 60 includes a plurality of resistive members 61. The resistive member 61 is a cell region formed by segmenting the heat generating resistive member 60 into a plurality of cells in a direction (Y-axis direction) perpendicular to the sheet conveyance direction. Both ends of the resistive member 61 are connected to electrodes 62, and the resistive member 61 generates heat when energized. The electrode 62 is formed by an aluminum layer.

While the heat generating resistive member 60 shown in FIG. 3, which is segmented into the plurality of cells, is employed in this embodiment, a plate-shaped heat generating resistive member that is formed integrally without segmentation may be employed instead.

FIG. 4A illustrates a configuration of the heater 32 according to the embodiment. FIG. 4B illustrates a configuration of a conventional heating member for comparison. In FIGS. 4A and 4B, the illustration of the endless belt 34 is omitted.

In the heater 32 shown in FIG. 4A, the above-described heat generating resistive member 60 is stacked on a ceramic substrate 70. A protective layer 90 made of a heat-resistant material is further stacked thereon to cover the heat generating resistive member 60. The protective layer 90 is provided in order to prevent the ceramic substrate 70 and the heat generating resistive member 60 from being in contact with the endless belt 34 (not shown). The provision of the protective layer 90 can reduce the abrasion of the endless belt 34. In this embodiment, the ceramic substrate 70 has a thickness of 1 to 2 mm. The protective layer 90 is made of $SiO_2$ and has a thickness of 60 to 80 μm.

A surface 90A of the protective layer 90 that faces a roller surface 31A of the pressure roller 31 has a depressed shape (concave shape) with respect to the opposed pressure roller 31. In other words, the surface 90A of the protective layer 90 that faces the pressure roller 31 has a concave surface that is concave with respect to the pressure roller 31. The surface 90A of the protective layer 90 has a curved surface that is convex toward the heat generating resistive member 60. As described above, the protective layer 90 covers the heat generating resistive member 60, and at least part of the surface 90A has a convex surface that is convex toward the heat generating resistive member 60. The surface 90A of the protective layer 90 has a shape cut in an arc shape to engage with the roller surface 31A of the pressure roller 31 and to cover, and be in contact with, the roller surface. As shown in FIG. 4A, the protective layer 90 has a shape in which outer portions near ends 91 and 92 each have an increased thickness (high in an X-axis direction) and a central portion has a reduced thickness (low in the X-axis direction).

When a radius of the pressure roller 31 is denoted by Rp and a radius of the arc shape of the protective layer 90 is denoted by R1, the relationship between their curvatures is expressed by: $1/Rp>1/R1$. More specifically, the radius R1 of the arc shape of the protective layer 90 is larger than the radius Rp of the pressure roller 31, i.e., the radius R1 has a less steep radius. In other words, the curvature of the concave surface of the protective layer 90 is smaller than the curvature of the surface of the pressure roller 31.

On the other hand, a conventional protective layer 80 for a heating member, which is shown in FIG. 4B, has a flat surface. As a result of the surface shape cut in an arc shape as in the protective layer 90 of the present embodiment, the nip width between the protective layer and the pressure roller 31 can be increased as compared to the conventional flat-surface protective layer 80 shown in FIG. 4B. In this manner, the surface shape cut in an arc shape enables the securement of a predetermined nip width without increasing the load of the pressure roller 31 or without increasing the radius of the pressure roller 31.

A case where the surface 90A of the protective layer 90 has a convex surface that is convex with respect to the pressure roller 31 will now be discussed. In this case, the convex surface pushes the heater 32, thus applying a heavy load to the heater 32. Consequently, the heater 32 becomes more breakable. Since the surface 90A of the protective layer 90 has a concave surface that is concave with respect to the pressure roller 31 in this embodiment, the load applied to the protective layer 90 from the pressure roller 31 can be confined within an appropriate range while securing the predetermined nip width between the protective layer 90 and the pressure roller 31.

While the protective layer 90 shown in FIG. 4A has the smallest thickness in its central portion, a thickness T1 of the thinnest portion is set to 60 μm or more. This is for ensuring the strength of the protective layer. In this embodiment, a thickness of at least 60 μm or more is secured.

As shown in FIG. 4A, the protective layer 90 has a horizontally symmetric shape. This is because the pressure roller 31 is in contact with the central portion of the protective layer 90. Depending on the contact location with the pressure roller 31, the protective layer 90 may have an asymmetric shape.

Figure 5:
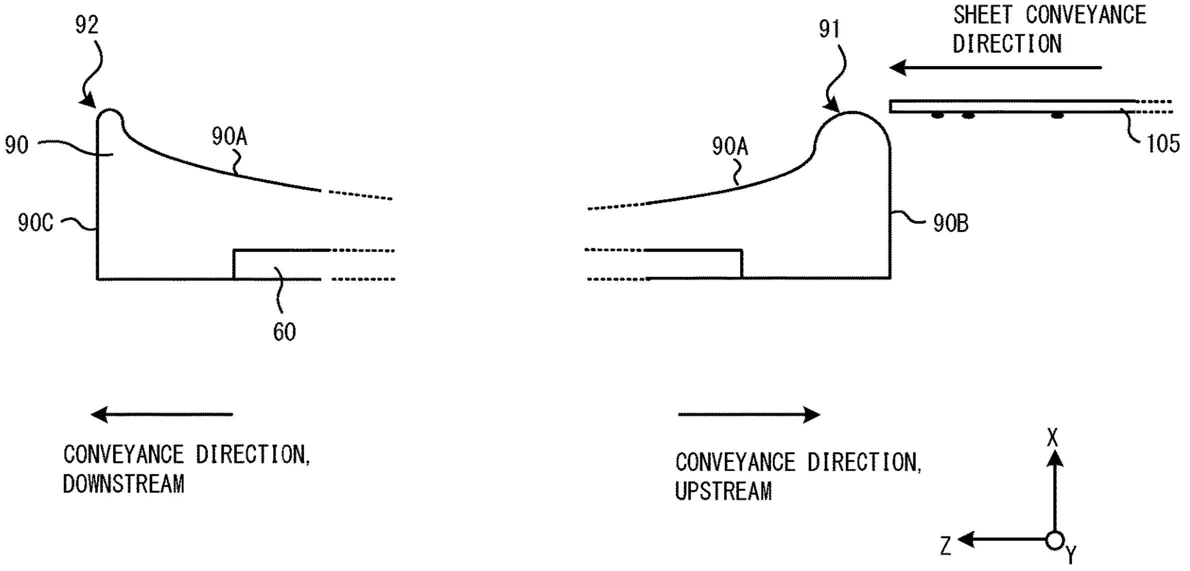
FIG. 5 is a diagram of the heating member according to the embodiment, focused on ends of a protective layer, in particular.

FIG. 5 is a diagram of the protective layer 90, focused on the shapes of the ends 91 and 92 (shapes of edges), in particular. In FIG. 5, the illustration of the endless belt 34 is omitted. The end 91 is positioned upstream in the sheet conveyance direction. The end 91 is a junction formed by the surface 90A and an upstream side surface 90B of the protective layer 90. The end 92 is positioned downstream in the sheet conveyance direction. The end 92 is a junction formed by the surface 90A and a downstream side surface 90C of the protective layer 90. Hereinafter, the end 91 (edge) is referred to as an upstream end, and the end 92 (edge) is referred to as a downstream end. As shown in FIG. 5, the tip shapes of the upstream end 91 and the downstream end 92 have curvatures to have arc shapes. The arc shape of the tip of the upstream end 91 and the arc shape of the tip of the downstream end 92 differ from each other in their radii and sizes.

When a radius of the arc shape of the tip of the upstream end 91 (radius of the edge) is denoted by r1 and a radius of the arc shape of the tip of the downstream end 92 (radius of the edge) is denoted by r2, their curvatures satisfy a magnitude relationship of: 1/r2>1/r1. In other words, the radius r1 of the upstream end 91 is larger, and thus less steep, than the radius r2 of the downstream end 92. In this embodiment, a ratio between r1 and r2 is set to about r1:r2=2:1. The value of r1 is set to about 0.08 mm, and the value of r2 is set to about 0.04 mm. The larger and less steep radius of the upstream end 91 facilitates the entry of a sheet into the nip portion. Moreover, the increased radius on the entrance side can reduce an introduction load on a sheet, and thus allows for the compatibility with a variety of sheets including heavy paper, for example. With regard to the surface 90A of the protective layer 90, a portion upstream of the portion (interposing and pressurizing region) where the nip width is formed in FIG. 4A has a larger curvature, and thus has a curved surface shape closer to the pressure roller 31. As just described, since the upstream portion of the surface 90A of the protective layer 90 has a larger curvature in this embodiment, the sheet 105 can be brought into contact with the protective layer 90 in that portion at an earlier stage. Thus, an amount of heat the sheet 105 receives from the heat generating resistive member 60 can be increased in this embodiment.

By reducing the radius of the downstream end 92 so as to have a sharper tip shape, on the other hand, the downstream end 92 pushes the sheet strongly via the endless belt 34, thereby facilitating the release of the sheet from the fixing device 30. The protective layer 90 is a member to be in contact with the endless belt 34. Thus, if the upstream end 91 and the downstream end 92 have pointed shapes, the endless belt 34 will easily deteriorate. Thus, the upstream end 91 and the downstream end 92 each formed in a rounded circular shape can also reduce the abrasion of the endless belt 34 in this embodiment.

The upstream end 91 and the downstream end 92 can also be stated as follows. In the protective layer 90, the upstream end 91 in the sheet conveyance direction (one end 91 in a shorter-side direction of the heat generating resistive member 60) protrudes in a stacking direction of the heat generating resistive member 60 and the protective layer 90 and has a curved top surface. In the protective layer 90, the downstream end 92 in the sheet conveyance direction (the other end in the shorter-side direction of the heat generating resistive member 60) protrudes in the stacking direction of the heat generating resistive member 60 and the protective layer 90 and has a curved top surface. The curvature of the curved surface of the upstream end 91 (the one end 91) and the curvature of the curved surface of the downstream end 92 (the other end) differ from each other. The curvature of the curved surface of the upstream end 91 is smaller than the curvature of the curved surface of the downstream end 92.

Second Embodiment

Figure 6:
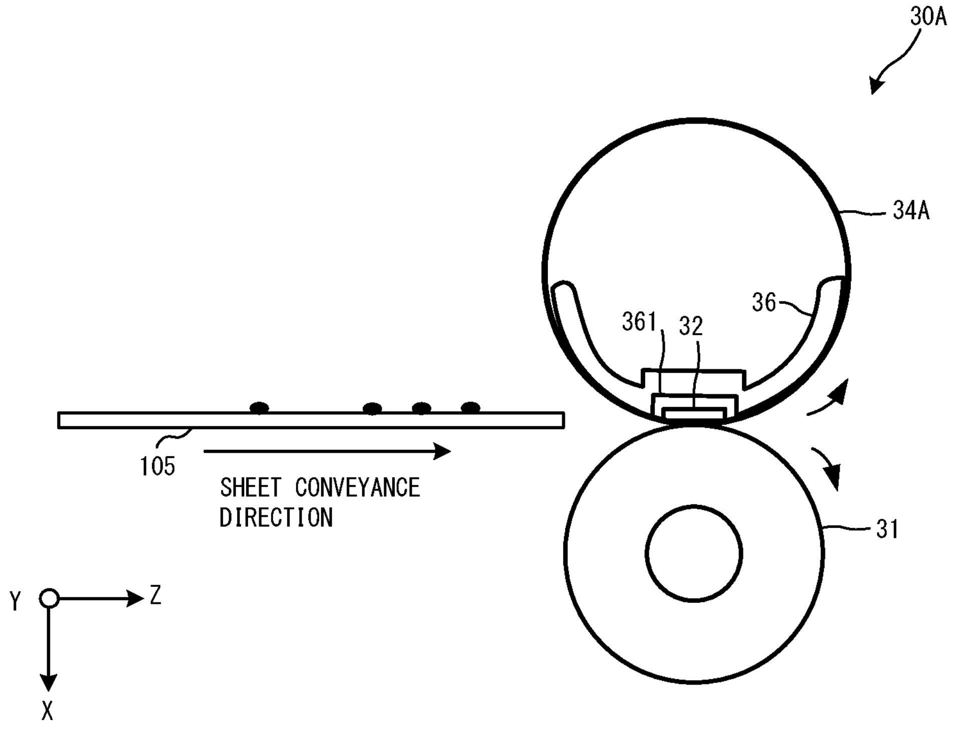
FIG. 6 is a diagram illustrating a configuration example of another fixing device.

The second embodiment describes an exemplary aspect in which the configuration of the fixing device in the first embodiment is modified. FIG. 6 is a diagram illustrating a configuration example of a fixing device 30A.

A film guide 36 has a semi-cylindrical shape and accommodates a heater 32 in a recess 361 provided on an outer periphery thereof.

A fixing film 34A (belt) is an endless rotating belt. The fixing film 34A is fitted over the outer periphery of the film guide 36. The fixing film 34A is interposed between the film guide 36 and a pressure roller 31 and driven by the rotation of the pressure roller 31.

The above-described heater 32 is in contact with the fixing film 34A to heat the fixing film 34A.

A sheet 105 having a toner image formed thereon is conveyed to a place between the fixing film 34A and the pressure roller 31. The fixing film 34A heats the sheet and thereby fixes the toner image on the sheet onto the sheet.

Figure 4:
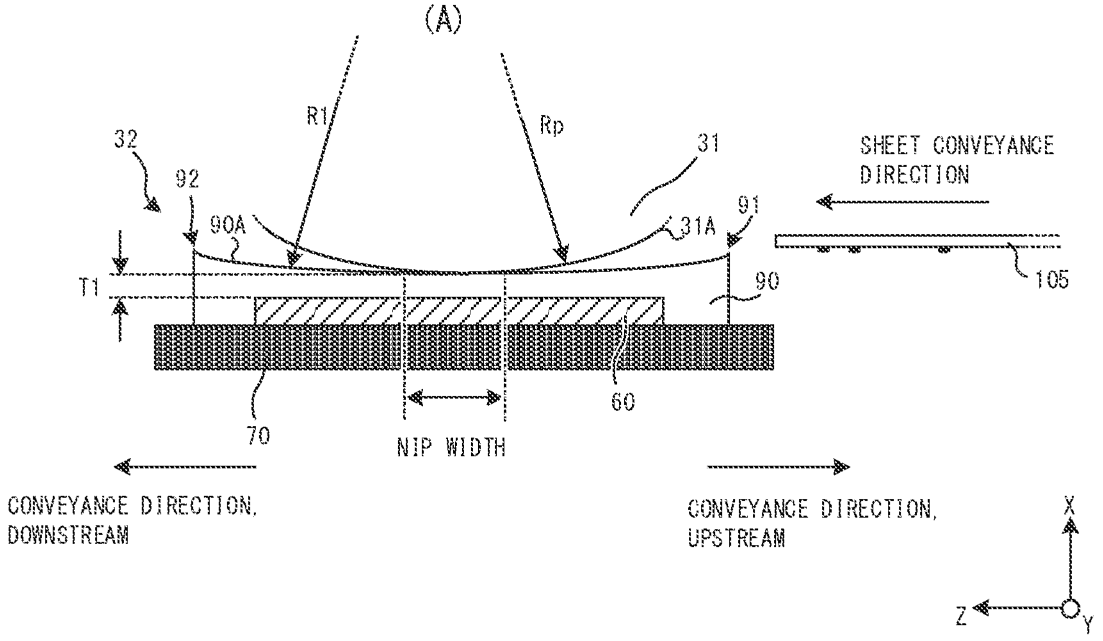
FIG. 4 is a diagram illustrating a heating member according to the embodiment, and a conventional heating member.
Figure 4:
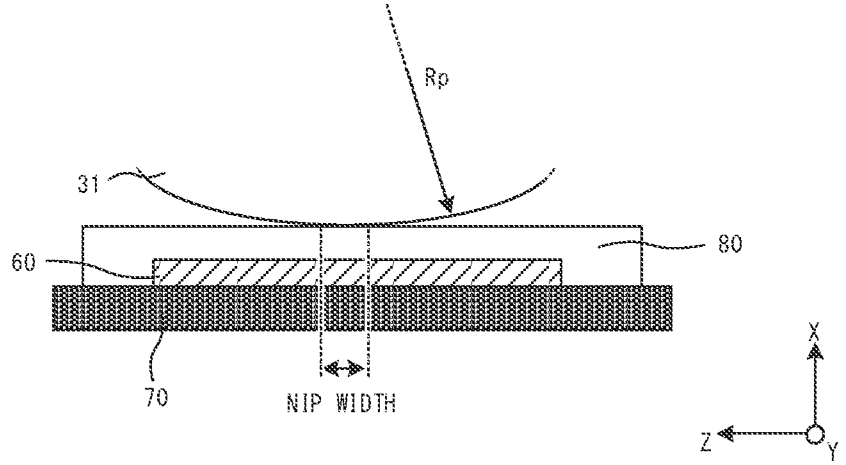

The aspects of the heater 32, etc., shown in FIGS. 3 to 5 can be also applied to the fixing device 30A of the second embodiment.

As described above in detail, the nip width between the heater 32 and the pressure roller 31 can be increased in the embodiments.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. A heater which is to face a pressure element via a belt and is to heat the belt, wherein the pressure element sandwiches and conveys a sheet together with the belt, the heater comprising:
a substrate;
a heat generating element on the substrate;
a couple of electrodes on both sides of the heat generating element in a conveyance direction of the sheet, wherein both sides of the heat generating element in the conveyance direction are connected to adjacent electrodes; and
a protective layer to cover the heat generating element, the protective layer having a surface, which has a plurality of increased thickness portions and a reduced thickness portion, facing the pressure element, wherein the pressure element presses the surface via the belt.

2. The heater according to claim 1, wherein
the plurality of increased thickness portions are outer portions near ends, each of the outer portions has an increased thickness, and
the reduced thickness portion is a central portion which has a thickness reduced comparing with the plurality of increased thickness portions.

3. The heater according to claim 1, wherein
the heat generating element is segmented into a plurality of resistive members in a first direction perpendicular to the conveyance direction and both ends of each of the resistive members are connected to the electrodes.

4. The heater according to claim 1, wherein
a curvature of the surface of the protective layer is smaller than a curvature of a surface of the pressure element.

5. The heater according to claim 1, wherein
in the protective layer, both outer portions in the conveyance direction are thicker than a central portion in the conveyance direction.

6. The heater according to claim 1, wherein
the heat generating element has a length in a first direction perpendicular to the conveyance direction and width in the conveyance direction.

7. The heater according to claim 1, further comprising a driving roller configured to contact an inner surface of the belt and arranged on a first plane along which the sheet is conveyed.

8. A fixing device, comprising:
a belt;
a heater heating the belt; and
a pressure element facing the heater via the belt and sandwiching and conveying a sheet together with the belt,
the heater comprising:
a substrate;
a heat generating element on the substrate;
a couple of electrodes on both sides of the heat generating element in a conveyance direction of the sheet, wherein both sides of the heat generating element in the conveyance direction are connected to adjacent electrodes; and
a protective layer to cover the heat generating element, the protective layer having a surface, which has a plurality of increased thickness portions and a reduced thickness portion, facing the pressure element, wherein the pressure element presses the surface via the belt.

9. The fixing device according to claim 8, wherein
the plurality of increased thickness portions are outer portions near ends, each of the outer portions has an increased thickness, and
the reduced thickness portion is a central portion which has a thickness reduced comparing with the plurality of increased thickness portions.

10. The fixing device according to claim 8, wherein
the heat generating element is segmented into a plurality of resistive members in a first direction perpendicular to the conveyance direction and both ends of each of the resistive members are connected to the electrodes.

11. The fixing device according to claim 8, wherein
a curvature of the surface of the protective layer is smaller than a curvature of the pressure element.

12. The fixing device according to claim 8, wherein
in the protective layer, both outer portions in the conveyance direction are thicker than a central portion in the conveyance direction.

13. The fixing device according to claim 8, wherein
the heat generating element has a length in a first direction perpendicular to the conveyance direction and width in the conveyance direction.

14. The fixing device according to claim 8, further comprising a driving roller configured to contact an inner surface of the belt and arranged on a first plane along which the sheet is conveyed.

15. An image forming apparatus, comprising:
an image forming unit configured to form a toner image on a sheet; and
a fixing device configured to heat the sheet to fix the toner image onto the sheet, the fixing device comprising:
a belt;
a heater heating the belt; and
a pressure element facing the heater via the belt and sandwiching and conveying the sheet together with the belt,
the heater comprising:
a substrate;
a heat generating element on the substrate;
a couple of electrodes on both sides of the heat generating element in a conveyance direction of the sheet, wherein both sides of the heat generating element in the conveyance direction are connected to adjacent electrodes; and
a protective layer to cover the heat generating element, the protective layer having a surface, which has a plurality of increased thickness portions and a reduced thickness portion, facing the pressure element, wherein the pressure element presses the concave surface via the belt.

16. The image forming apparatus according to claim 15, wherein
the plurality of increased thickness portions are outer portions near ends, each of the outer portions has an increased thickness, and
the reduced thickness portion is a central portion which has a thickness reduced comparing with the plurality of increased thickness portions.

17. The image forming apparatus according to claim 15, wherein
the heat generating element is segmented into a plurality of resistive members in a first direction perpendicular to the conveyance direction and both ends of each of the resistive members are connected to the electrodes.

18. The image forming apparatus according to claim 15, wherein a curvature of the surface of the protective layer is smaller than a curvature of the pressure element.

19. The image forming apparatus according to claim 15, wherein in the protective layer, both outer portions in the conveyance direction are thicker than a central portion in the conveyance direction.

20. The image forming apparatus according to claim 15, wherein the heat generating element has a length in a first direction perpendicular to the conveyance direction and width in the conveyance direction.

* * * * *